UNITED STATES PATENT OFFICE.

HEINRICH DRESLER, OF CREUZTHAL, GERMANY, ASSIGNOR TO CÖLN-MÜSENER BERGWERKS ACTIEN VEREIN, OF CREUZTHAL, GERMANY, A CORPORATION OF GERMANY.

PROCESS FOR THE MANUFACTURE OF ARTIFICIAL STONE.

No. 876,782.     Specification of Letters Patent.     Patented Jan. 14, 1908.

Application filed February 14, 1906. Serial No. 301,041.

*To all whom it may concern:*

Be it known that I, HEINRICH DRESLER, director of the Cöln-Müsener Bergwerks Actien Verein, of Creuzthal, Westphalia, Germany, a subject of the German Emperor, and resident of Creuzthal, Westphalia, Germany, have invented a new and useful Process for the Manufacture of Artificial Stone, Blocks, Pipes, Briquets, and the Like, of which the following is a specification.

This invention relates to a process for manufacturing artificial stone, blocks and pipes as well as briquets of various kinds by means of ground slag.

The process according to this invention differs from previous processes of similar kind by the fact that the finished product is submitted to carbonic acid or to gases containing carbonic acid under pressure at the ordinary temperature. This results in the process being greatly simplified, as the manufacturer becomes independent of boiler installations, and all losses through radiation of heat are avoided.

The slag (for instance blast furnace slag) is ground, mixed with water, with or without the addition of lime, pressed into molds and then kept for a considerable time (several hours) under pressure of carbonic acid or gas mixtures containing carbonic acid, whereupon very strong stone material of elegant appearance is obtained.

Suitable gas mixtures containing carbonic acid are often available in technical working in large quantities, for instance, as waste gases from lime kilns, coke furnaces, boiler furnaces and other furnace installations, generators and the like, and more particularly as burned or unburned blast furnace gases. These gases can be drawn off and forced by means of a compressor into the "setting" vessel or boiler. The pressure is preferably increased to several atmospheres.

The slag can be previously granulated in water or air or can be solidified from a fluid state. When it is desired to convert into briquets, ores, dust from blast furnace charges and the like, these substances are mixed with finely ground slag, with or without addition of lime and blocks or other structures are formed and treated as just described. If blast furnace gases are allowed to act without compression the process takes a correspondingly longer time.

Having now particularly described and ascertained the nature of this said invention, and in what manner the same is to be performed, I declare that what I claim is:—

1. The process of manufacturing artificial stone, which consists in grinding slag, mixing it with water, pressing it, and then subjecting it for a considerable time to the action of carbonic acid gas under pressure at the ordinary temperature substantially as described.

2. The process of manufacturing stone, which consists in grinding slag, mixing it with lime and water, pressing the mixture into molds, and then subjecting the same to carbonic acid gas under pressure for a considerable time at the ordinary temperature, substantially as described.

In testimony, that I claim the foregoing as my invention, I have signed my name in presence of two witnesses, this 30th day of January, 1906.

HEINRICH DRESLER.

Witnesses:
   BESSIE F. DUNLAP,
   R. H. DUNLAP.